United States Patent
Harrison et al.

(10) Patent No.: US 10,726,163 B2
(45) Date of Patent: Jul. 28, 2020

(54) PROTECTING CRYPTOGRAPHIC SYSTEMS FROM COLD BOOT AND OTHER SIDE CHANNEL ATTACKS

(71) Applicant: International Business Machines Corporation, Armonk, NY (US)

(72) Inventors: Justin L. Harrison, Delaware, OH (US); Liviu Rodean, Hilliard, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 238 days.

(21) Appl. No.: 15/354,085

(22) Filed: Nov. 17, 2016

(65) Prior Publication Data

US 2018/0139037 A1   May 17, 2018

(51) Int. Cl.
  *G06F 21/78*    (2013.01)
  *G06F 21/55*    (2013.01)
  *H04L 9/00*     (2006.01)
  *G06F 21/86*    (2013.01)

(52) U.S. Cl.
  CPC ............ *G06F 21/78* (2013.01); *G06F 21/554* (2013.01); *G06F 21/86* (2013.01); *G06F 2221/2143* (2013.01); *H04L 9/002* (2013.01)

(58) Field of Classification Search
  None
  See application file for complete search history.

(56) References Cited

U.S. PATENT DOCUMENTS

| | | | |
|---|---|---|---|
| 5,231,666 A * | 7/1993 | Matyas | G06F 9/30003 705/66 |
| 5,933,498 A * | 8/1999 | Schneck | G06F 21/10 705/54 |
| 7,607,025 B1 * | 10/2009 | Trimberger | G06F 21/554 713/189 |
| 8,032,510 B2 | 10/2011 | Boerries et al. | |
| 8,331,189 B1 | 12/2012 | Pancoast et al. | |
| 8,458,804 B1 | 6/2013 | Hyde et al. | |
| 8,583,887 B1 * | 11/2013 | Patel | G06F 13/00 711/161 |
| 8,650,639 B2 | 2/2014 | Adams et al. | |
| 8,892,875 B1 * | 11/2014 | Baldwin | H04L 9/0891 713/165 |
| 9,129,327 B1 | 9/2015 | Cheung et al. | |
| 9,246,884 B1 | 1/2016 | Pfab et al. | |
| 9,250,671 B2 | 2/2016 | Tucker | |
| 9,367,697 B1 * | 6/2016 | Roth | G06F 21/602 |
| 9,378,156 B2 | 6/2016 | Gillespie et al. | |
| 9,491,737 B2 | 11/2016 | Hart et al. | |
| 9,547,457 B1 * | 1/2017 | Banerjee | G06F 3/0653 |
| 9,913,409 B2 * | 3/2018 | Cutler | F24F 5/0046 |
| 2005/0055318 A1 * | 3/2005 | Ziegler | G06Q 20/347 705/72 |

(Continued)

*Primary Examiner* — Benjamin E Lanier
(74) *Attorney, Agent, or Firm* — Garg Law Firm, PLLC; Rakesh Garg; Jeffrey S LaBaw

(57) ABSTRACT

An electrical signal indicative of an intrusion is detected at an application executing in a cryptographic data processing system. In response to the detection, an instruction is constructed in the application for the cryptographic data processing system. Using a processor, the instruction causes a cryptographic data item to be removed from a portion of a memory device installed in the cryptographic system.

19 Claims, 5 Drawing Sheets

(56) References Cited

U.S. PATENT DOCUMENTS

| | | | |
|---|---|---|---|
| 2005/0078604 A1* | 4/2005 | Yim | H04L 69/16 370/235 |
| 2005/0166002 A1* | 7/2005 | Wallace | G06F 21/79 711/100 |
| 2006/0178997 A1* | 8/2006 | Schneck | G06F 21/10 705/50 |
| 2006/0242178 A1 | 10/2006 | Butterfield et al. | |
| 2006/0272027 A1* | 11/2006 | Noble | G06F 12/1408 726/27 |
| 2007/0204170 A1* | 8/2007 | Oren | G06F 21/72 713/189 |
| 2009/0086965 A1* | 4/2009 | Glendinning | G06F 12/1408 380/44 |
| 2009/0220088 A1* | 9/2009 | Lu | G06F 21/554 380/277 |
| 2010/0017879 A1* | 1/2010 | Kuegler | G06F 21/123 726/23 |
| 2010/0067689 A1* | 3/2010 | Laffey | H04L 9/0877 380/44 |
| 2011/0239306 A1* | 9/2011 | Avni | G06F 21/54 726/26 |
| 2013/0036314 A1 | 2/2013 | Glew et al. | |
| 2013/0257473 A1* | 10/2013 | Adams | G06F 21/86 326/8 |
| 2014/0215613 A1 | 7/2014 | Kelley et al. | |
| 2014/0263646 A1* | 9/2014 | Manesh | G06K 7/084 235/440 |
| 2014/0320261 A1* | 10/2014 | Davis | G06K 7/10227 340/5.61 |
| 2014/0359415 A1 | 12/2014 | Song et al. | |
| 2015/0052616 A1* | 2/2015 | Hutchison | G06F 21/53 726/27 |
| 2016/0057160 A1* | 2/2016 | Buehler | B64D 45/00 726/23 |
| 2016/0098918 A1* | 4/2016 | Loisel | G06K 19/07336 726/20 |

\* cited by examiner

PROTECTING CRYPTOGRAPHIC SYSTEMS FROM COLD BOOT AND OTHER SIDE CHANNEL ATTACKS

TECHNICAL FIELD

The present invention relates generally to a method, system, and computer program product for preventing malicious attacks on cryptographic systems. More particularly, the present invention relates to a method, system, and computer program product for protecting cryptographic systems from cold boot and other side channel attacks.

BACKGROUND

Hereinafter, a system that has at least one cryptographic key stored in memory, whether or not a component in the system is using the key, is interchangeably referred to as simply "cryptographic system" unless expressly disambiguated where used. For example, a cryptographic system may simply hold a cryptographic key in memory for another system. As another example, a cryptographic system may store a cryptographic key in memory and allow a storage device mounted in the same system to use the stored cryptographic key.

A side channel attack is an attack on the physical machine of the cryptographic system. In other words, an attacker physically touches, comes in close proximity, or otherwise gains physical access (not over a data network) to a physical component physically connected to the machine or inside the machine.

A cold boot attack is an example of a side channel attack. Cold boot attacks against cryptographic systems involve acquiring physical access to a computer containing secured data while that data is in memory, applying low temperatures to the memory device—e.g. the Random Access Memory (RAM) modules, and then either rebooting the system using a specialized boot device to read the cryptographic keys from the cooled memory device, or removing the memory device while still cold from the cryptographic system and installing the cold memory device in a malicious system designed to read the contents from the cold memory device.

SUMMARY

The illustrative embodiments provide a method, system, and computer program product. An embodiment includes a method that detects, at an application executing in a cryptographic data processing system, an electrical signal indicative of an intrusion. The embodiment constructs in the application, responsive to the detecting, an instruction for the cryptographic data processing system. The embodiment causes, using a processor, and responsive to the instruction, a cryptographic data item to be removed from a portion of a memory device installed in the cryptographic system.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
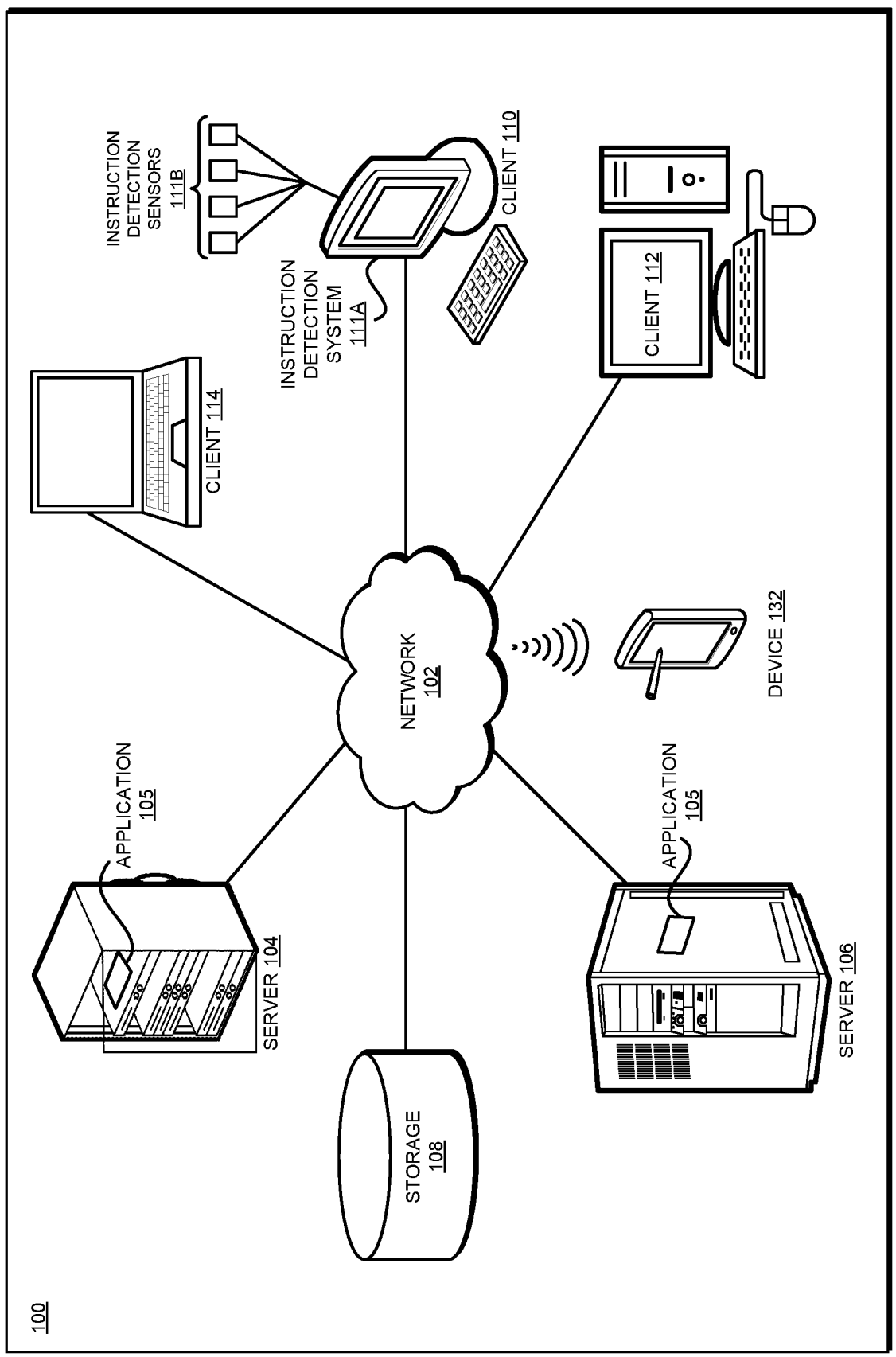
FIG. 1 depicts a block diagram of a network of data processing systems in which illustrative embodiments may be implemented.

The illustrative embodiments recognize that presently, physical security of a computer is achieved by one of two ways—securing the perimeter or the premises where the computer is physically located, or modifying the hardware of the computer to thwart tampering with the computer. For example, an entry into a datacenter may be alarmed, notifying security personnel of a breach if an unwanted person tries to gain physical access into the datacenter. As another example, a computer may have a cage or case that is uni-body, or have modified security hardware that is difficult to open, or is connected to an alarm which is set off if the computer is physically moved.

The illustrative embodiments recognize that the presently used methods of physically securing a computer are either implemented on a system-by-system basis, or require hardware modification in the computer, or both. The presently used methods of securing the premises where the computer is located offer very limited physical security to the computer itself, and much less to the data in the memory of the computer. For example, the presently available intrusion detection systems to secure premises do nothing more than merely detect a break-in into a building or into a rack. The presently available intrusion detection systems play no further role in securing the cryptographic data in the memory modules of a set of computers that reside inside the building or the rack.

The illustrative embodiments recognize that the presently available tools or solutions do not address these needs or provide adequate solutions for these needs. The illustrative embodiments used to describe the invention generally address and solve the above-described problems and other problems related to protecting cryptographic systems from cold boot and other side channel attacks.

An embodiment can be implemented as a software application. The application implementing an embodiment can be configured as a modification of an existing intrusion detection system, as a separate application that operates in conjunction with an existing intrusion detection system, a standalone application, or some combination thereof.

An embodiment executes as an application in a cryptographic system. Any number of cryptographic systems can similarly execute copies or instances of the embodiment.

The intrusion detection system produces an electrical signal in response to detecting an intrusion of a premise or perimeter, as they presently do. The electrical signal can take the form of a voltage change on a wire, a data packet transmission on a network, a flag set or reset in an electronic device, an indication displayed or presented using an electronic device, activate an electrical or electronic device, and so on. For example, an intrusion detection system may activate an electrical device to produce an audible sound, light up an indicator on an electrical panel or an electronic screen, send a message to a security personnel's telecommunication device, send a data packet on a data network via Transmission Control Protocol (TCP) or User Datagram Protocol (UDP) to one or more listening network adapters devices, and so on.

An embodiment detects an intrusion signal from an existing intrusion detection system. As a non-limiting example, the embodiment may receive a packet from a network adapter that is listening for signals produced from the intrusion detection system.

When an intrusion detection signal is received at the embodiment, the embodiment causes one or more actions to occur at the cryptographic system where the embodiment is operating. One such action is to cause a removal of a cryptographic data item from a memory device operating in the cryptographic system.

One example way of removing a data item from a memory is to flush the memory. Accordingly, one embodiment causes a flushing of the entire memory or a portion thereof, depending upon where and how the cryptographic data item is stored in the memory. For example, the embodiment may cause the flushing of only a certain address-range of the memory.

Another embodiment further ensures that the flushed cryptographic data item is unrecoverable from the flushed memory. For example, the embodiment further causes the flushed memory or the flushed portion thereof to be overwritten with other data, e.g., random data.

An embodiment causes additional actions to occur in the cryptographic system. For example, data that is cryptographically secured using the cryptographic data item can become corrupted when the cryptographic data item is flushed from the memory. Therefore, an example additional action is to ensure the continued security and integrity of the secured data. To accomplish this continued security and integrity, the embodiment causes the additional action of dismounting, deregistering, stopping, or otherwise separating a storage device where the secured data is stored from the cryptographic system.

Operating in this manner, the illustrative embodiments take cryptographic data-specific actions at one or more cryptographic systems in response to any electrical indication of a physical breach that may jeopardize the cryptographic data. Any number of cryptographic systems can simultaneously act on an intrusion detection system signal of any type described herein. Different actions and additional actions are configurable in the different instances of the embodiments executing in different cryptographic systems, or under difference circumstances present during the intrusion. For example, at intrusion 1, an embodiment may flush the entire memory of a cryptographic system, whereas at intrusion 2, the same embodiment may selectively flush only certain cryptographic data items that are loaded in the memory at that time.

These examples of the possible different configurations and operations are not intended to be limiting. From this disclosure, those of ordinary skill in the art will be able to conceive many other possible configurations and operations under different circumstances, and the same are contemplated within the scope of the illustrative embodiments.

The manner of protecting cryptographic systems from cold boot and other side channel attacks described herein is unavailable in the presently available methods. A method of an embodiment described herein, when implemented to execute on a device or data processing system, comprises substantial advancement of the functionality of that device or data processing system in securing the cryptographic data loaded in the memory according to the circumstances prevailing at the cryptographic system at the time of the intrusion.

The illustrative embodiments are described with respect to certain types of cryptographic data items, memories, signals, actions, additional actions, circumstances, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
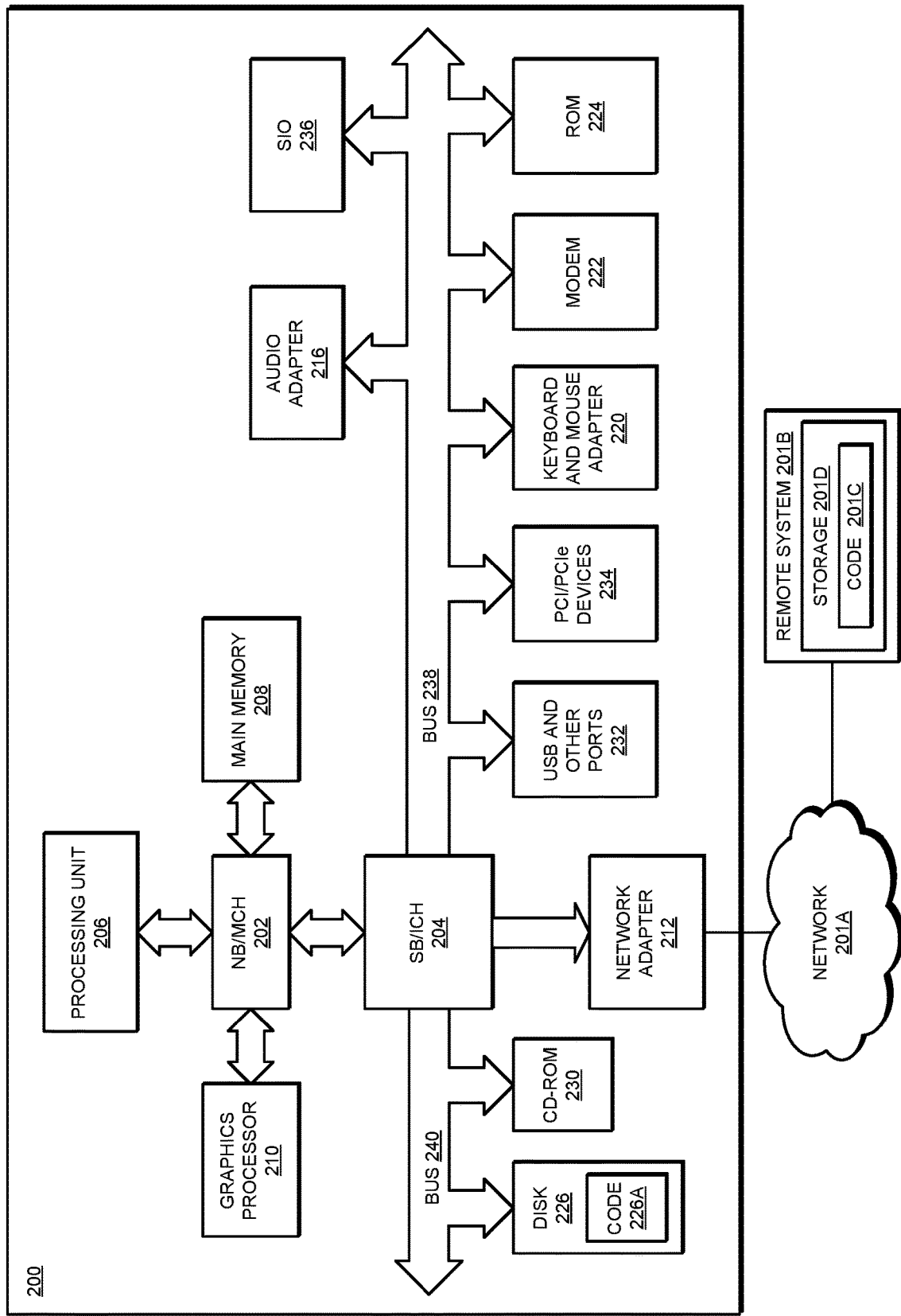
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Only to demonstrate that multiple cryptographic systems can be secured using instances of an embodiment, another instance of application 105 is depicted in server 106. Servers 104 and 106 are each an example of a cryptographic system. Client 110 implements intrusion detection system 111A. As an example, intrusion detection system 111A may be an application associated with an intrusion detection system, which uses signals from one or more intrusion detection sensors 111B to determine whether there has been an undesirable intrusion into a premise. Intrusion detection system 111A produces the electrical signal described herein, e.g., in the form of a data transmission over network 102, which is detected by application 105 in server 104, and any number of other cryptographic systems where instances of application 105 may be executing.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
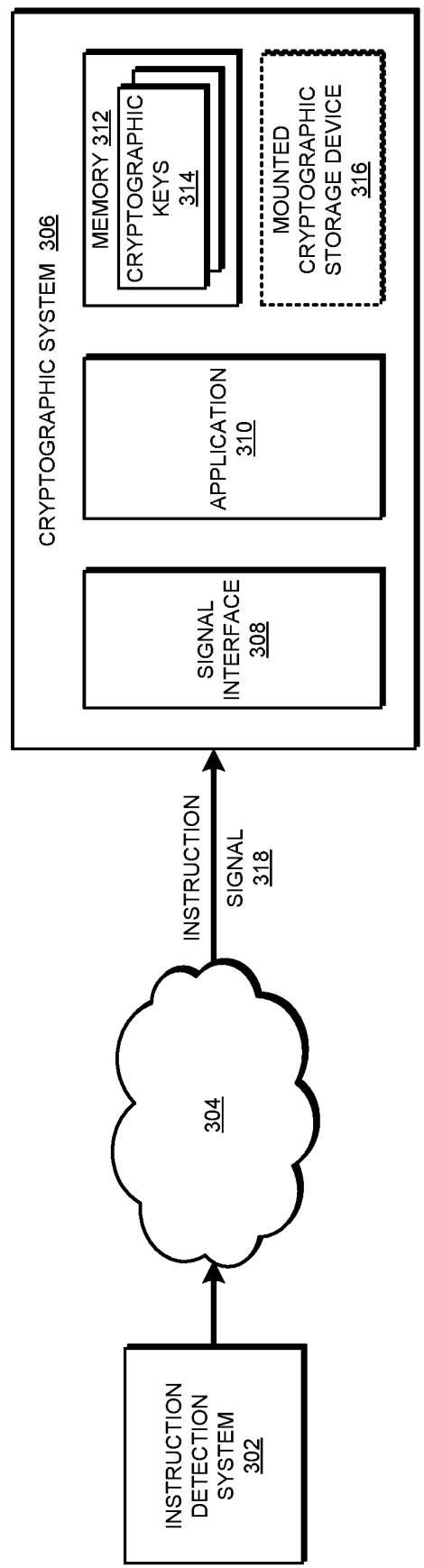
FIG. 3 depicts a block diagram of an example configuration for protecting cryptographic systems from cold boot and other side channel attacks in accordance with an illustrative embodiment.

With reference to FIG. 3, this figure depicts a block diagram of an example configuration for protecting cryptographic systems from cold boot and other side channel attacks in accordance with an illustrative embodiment. Application 302 is an example of application 105 in FIG. 1.

Application 302 executes in cryptographic system 304, which is an example of server 104 or 106 in FIG. 1. Intrusion detection system 306 is an example of intrusion detection system 111A in FIG. 1, and sends electrical intrusion signal 308 over network 310. Network 310 is an example of network 102 in FIG. 1.

Cryptographic system 304 includes memory 312, which stores one or more cryptographic keys 314. Storage device 316 is a non-limiting example of a component of cryptographic system 304, which uses cryptographic key 314. As a non-limiting example, storage device 316 may be mounted to or in system 304.

Signal interface 318 is a suitable hardware, software, or firmware component to detect intrusion signal 308. As a non-limiting example, signal interface 318 may be a network interface card (NIC) installed in or accessible to cryptographic system 304.

Intrusion detection system 306 detects an intrusion, as described herein. Intrusion detection system 306 transmits intrusion signal 308 over network 310. Intrusion signal 308 is detected by signal interface 318 at cryptographic system 304. The detection of intrusion signal 308 using signal interface 318 causes application 302 to cause one or more actions to occur at memory 312. Optionally, the detection of intrusion signal 308 using signal interface 318 causes application 302 to cause one or more additional actions to occur at component 316.

Figure 4:
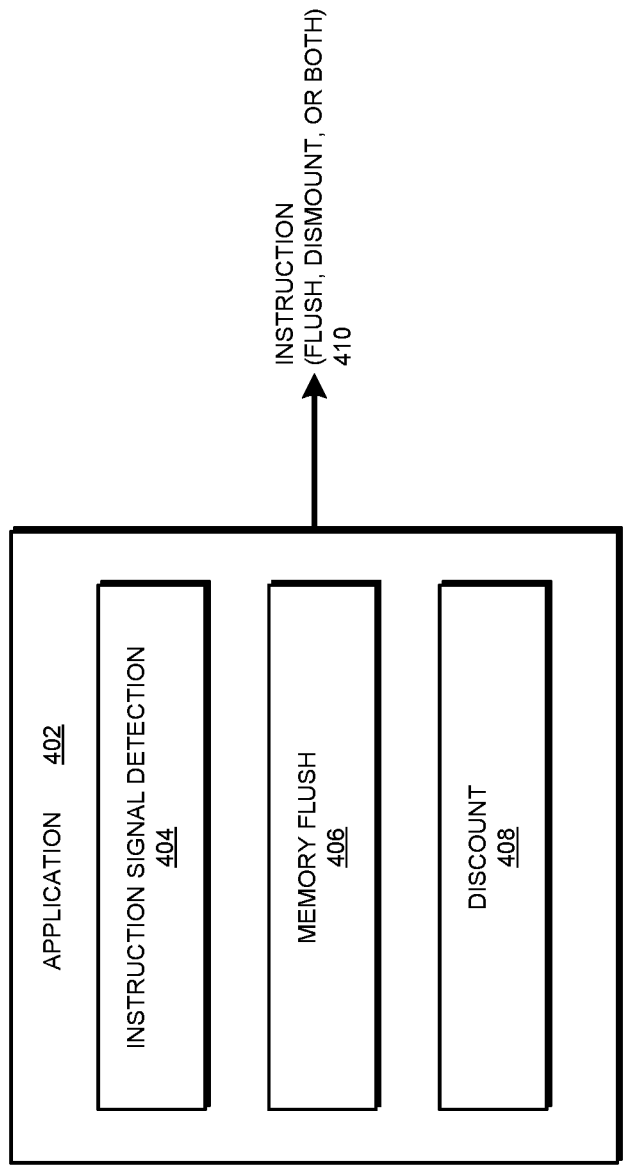
FIG. 4 depicts a block diagram of an example configuration of an application for protecting cryptographic systems from cold boot and other side channel attacks in accordance with an illustrative embodiment.

With reference to FIG. 4, this figure depicts a block diagram of an example configuration of an application for protecting cryptographic systems from cold boot and other side channel attacks in accordance with an illustrative embodiment. Application 402 is an example of application 302 in FIG. 3, and receives intrusion signal 308 as described in FIG. 3. For example, signal interface 318 of FIG. 3 detects intrusion signal 308 and passes signal 308 to application 402.

Component 404 detects and interprets signal 308. For example, some intrusion signals 308 may not apply to the cryptographic system where application 402 is executing. Accordingly, component 404 ignores such signals 308 and identifies a signal 308 that presents a threat to the cryptographic system where application 402 is executing. In some implementations, no intrusion signal 308 may be ignored and all intrusion signals 308 may be regarded as threats.

If intrusion signal 308 is deemed an indication of a threat by component 404, component 406 causes an action on the memory, e.g., on memory 312 in FIG. 3. For example, according to one embodiment, component 406 evaluates whether any cryptographic keys are loaded in the memory, and the locations or area where the keys are located. Component 406 then composes instruction 410 for the cryptographic system, or otherwise instructs the cryptographic system, to flush all data in the memory, only the cryptographic keys in the memory, or a portion—e.g., a designated area, a set of addresses, or a determined address range—of the memory.

If intrusion signal 308 is deemed an indication of a threat by component 404, component 408 may, but need not necessarily, cause an additional action to occur in the cryptographic system, e.g., on storage device 316 in FIG. 3. For example, according to one embodiment, component 408 evaluates whether any components are using any cryptographic keys that are loaded in the memory. Component 408 determines a manner in which the component is using the key. Depending on the usage and the manner of the usage, component 408 adds to instruction 410, composes another instruction for the cryptographic system, or otherwise instructs the cryptographic system, to ensure that the data secured by the flushed key remains secure and uncorrupted at the component. For example, component 408 causes the cryptographic system to dismount a mounted cryptographic storage device.

Figure 5:
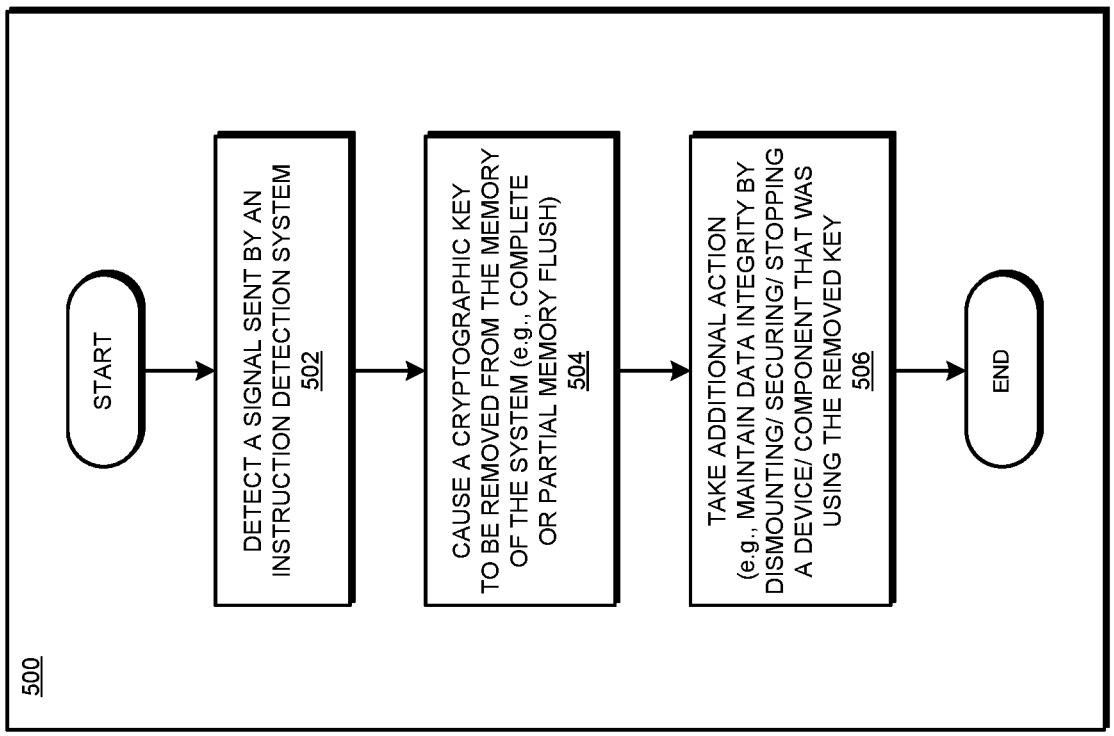
FIG. 5 depicts a flowchart of an example process for protecting cryptographic systems from cold boot and other side channel attacks in accordance with an illustrative embodiment.

With reference to FIG. 5, this figure depicts a flowchart of an example process for protecting cryptographic systems from cold boot and other side channel attacks in accordance with an illustrative embodiment. Process 500 can be implemented in application 402 in FIG. 4.

The application detects a signal sent by an intrusion detection system (block 502). The application optionally determines that the signal is a threat to the cryptographic system where the application is executing (block 504).

The application causes a cryptographic key to be removed from the memory of the cryptographic system, e.g., by a complete or partial flush of the memory (block 506). Optionally, the application ensures that the flushed key is not recoverable from the memory, e.g., by overwriting the memory at the address previously occupied by the flushed key (block 508).

The application optionally takes one or more additional actions, such as maintaining data integrity of the data secured by the flushed key in the manner described herein (block 510). The application ends process 500 thereafter.

Thus, a computer implemented method, system or apparatus, and computer program product are provided in the illustrative embodiments for protecting cryptographic systems from cold boot and other side channel attacks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

detecting, at an application executing in a cryptographic data processing system, an electrical signal indicative of an intrusion;

determining that the electrical signal is a threat to the cryptographic data processing system where the application is executing;

determining, responsive to determining that the electrical signal is a threat to the cryptographic data processing system, whether a cryptographic data item is stored in a volatile memory of the cryptographic data processing system, the volatile memory comprising volatile storage of the cryptographic data processing system, the cryptographic data item being stored in the volatile memory during the determining that the electrical signal is a threat to the cryptographic data processing system;

determining, responsive to determining that the cryptographic data item is stored in the volatile memory, that a secured data stored in a mounted nonvolatile storage device of the cryptographic data processing system is encrypted using the cryptographic data item, the secured data being stored in the mounted nonvolatile storage device during the determining that the electrical signal is a threat to the cryptographic data processing system;

causing, using a processor, and responsive to determining that the cryptographic data item is stored in the volatile memory, the cryptographic data item to be removed from a portion of the volatile memory; and causing, responsive to determining that the secured data is encrypted using the cryptographic data item, dismounting of the mounted nonvolatile storage device, the dismounting preventing a corruption of the secured data.

2. The method of claim 1, further comprising:

analyzing data stored in the volatile memory to determine whether a cryptographic key is stored in the volatile memory, wherein the cryptographic data item is the cryptographic key, wherein the portion of the memory is an address of the cryptographic key, and wherein the causing is responsive to the determining that the cryptographic key is stored in the volatile memory.

3. The method of claim 1, further comprising:

flushing, as a part of the causing, the portion of the volatile memory.

4. The method of claim 1, further comprising:

causing, as a part of the removing, an overwriting of the portion of the volatile memory with other data.

5. The method of claim 1, wherein the mounted nonvolatile storage device has been mounted into the cryptographic data processing system from another data processing system.

6. The method of claim 1, further comprising:

receiving the electrical signal from an intrusion detection system over a data network, wherein the electrical signal comprises receiving data at a signal interface in the cryptographic system.

7. The method of claim 1, wherein the electrical signal is a data packet sent from an intrusion detection system over a data network using Transmission Control Protocol (TCP).

8. The method of claim 1, wherein the electrical signal is a data packet sent from an intrusion detection system over a data network using User Datagram Protocol (UDP).

9. The method of claim 1, wherein the electrical signal is a message sent from an intrusion detection system to a telecommunication device of a security personnel.

10. The method of claim 1, further comprising:

receiving a second electrical signal at the application;

evaluating the electrical signal, the evaluating determining that the electrical signal is indicative of the threat to the cryptographic data processing system; and determining that the second signal is not indicative of any threat to the cryptographic data processing system.

11. A computer usable program product comprising one or more computer-readable storage devices, and program instructions stored on at least one of the one or more storage devices, the stored program instructions comprising:

program instructions to detect, at an application executing in a cryptographic data processing system, an electrical signal indicative of an intrusion;

program instructions to determine that the electrical signal is a threat to the cryptographic data processing system where the application is executing;

program instructions to determine, responsive to determining that the electrical signal is a threat to the cryptographic data processing system, whether a cryptographic data item is stored in a volatile memory of the cryptographic data processing system, the volatile memory comprising volatile storage of the cryptographic data processing system, the cryptographic data item being stored in the volatile memory during the determining that the electrical signal is a threat to the cryptographic data processing system;

program instructions to determine, responsive to determining that the cryptographic data item is stored in the volatile memory, that a secured data stored in a mounted nonvolatile storage device of the cryptographic data processing system is encrypted using the cryptographic data item, the secured data being stored in the mounted nonvolatile storage device during the determining that the electrical signal is a threat to the cryptographic data processing system;

program instructions to cause, using a processor, and responsive to determining that the cryptographic data item is stored in the volatile memory, the cryptographic data item to be removed from a portion of the volatile memory; and program instructions to cause, responsive to determining that the secured data is encrypted using the cryptographic data item, dismounting of the mounted nonvolatile storage device, the dismounting preventing a corruption of the secured data.

12. The computer usable program product of claim 11, further comprising:

program instructions to analyze data stored in the volatile memory to determine whether a cryptographic key is stored in the volatile memory, wherein the cryptographic data item is the cryptographic key, wherein the portion of the memory is an address of the cryptographic key, and wherein the causing is responsive to the determining that the cryptographic key is stored in the volatile memory.

13. The computer usable program product of claim 11, further comprising:

program instructions to flush, as a part of the causing, the portion of the volatile memory.

14. The computer usable program product of claim 11, further comprising:

program instructions to cause, as a part of the removing, an overwriting of the portion of the volatile memory with other data.

15. The computer usable program product of claim 11, wherein the mounted nonvolatile storage device has been mounted into the cryptographic data processing system from another data processing system.

16. The computer usable program product of claim 11, wherein the computer usable code is stored in a computer readable storage device in a data processing system, and wherein the computer usable code is transferred over a network from a remote data processing system.

17. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to detect, at an application executing in a cryptographic data processing system, an electrical signal indicative of an intrusion;

program instructions to determine that the electrical signal is a threat to the cryptographic data processing system where the application is executing;

program instructions to determine, responsive to determining that the electrical signal is a threat to the cryptographic data processing system, whether a block of addresses in a volatile memory of the cryptographic data processing system stores a cryptographic key, the volatile memory comprising volatile storage of the cryptographic data processing system, the cryptographic key being stored at the block of addresses during the determining that the electrical signal is a threat to the cryptographic data processing system;

program instructions to determine, responsive to determining that the block of addresses stores the cryptographic key, that a secured data stored in a mounted nonvolatile storage device of the cryptographic data processing system is encrypted using the cryptographic key, the secured data being stored in the mounted nonvolatile storage device during the determining that the electrical signal is a threat to the cryptographic data processing system;

program instructions to cause, using a processor, and responsive to determining that the block of addresses stores the cryptographic key, the cryptographic key to be removed from the block of addresses; and program instructions to cause, responsive to determining that the secured data is encrypted using the cryptographic key, dismounting of the mounted nonvolatile storage device, the dismounting preventing a corruption of the secured data.

19. The method of claim 1, further comprising:

encrypting, prior to detection of an electrical signal, using the cryptographic data item, the secured data in the mounted nonvolatile storage device of the cryptographic processing system.

* * * * *